Patented Apr. 10, 1945

2,373,308

UNITED STATES PATENT OFFICE 2,373,308

RUBBER BONDING MEDIUM

Corydon M. Grafton, Grosse Pointe, Mich., assignor to United States Rubber Company, New York, N. Y., a corporation of New Jersey No Drawing. Application January 13, 1942, Serial No. 426,561

10 Claims. (Cl. 154—43)

This invention relates to adhesion and more particularly it relates to a means for bonding a vulcanizable rubber composition to a non-compatible material such as metal.

The bonding of a rubber composition directly to a metal is usually limited to metals which at least have a deposit of brass on the bonding surface. Other practices have been employed in the use of an intermediate layer such as a rubber hydrochloride and a vulcanizing agent. I have found that vulcanizable rubber may be bonded to various materials such as metal, glass, wood and the like to the extent that an adhesion is obtained which is substantially equal to the strength of the rubber composition itself. The materials which I employ as an intermediate layer are a rubber chloride and a 1,3-dihalo 5,5-dialkyl hydantoin such as 1,3-dichlor 5,5-dimethyl hydantoin. To this composition may be added a plasticizer and/or a catalyst.

Among the objects of my invention are to provide a material which when used as an intermediate layer between a vulcanizable rubber composition and a hard surface material, will result in a high degree of adhesion; to provide a material which will produce a high degree of adhesion between a rubber composition and a variety of materials such as metal, plastics, glass, wood and the like; and, to provide a material which is economical for the purpose and which may be applied easily and efficiently.

In the practice of my invention, I prepare a composition which may be applied as a coating to a surface of a rubber composition and/or to the surface against which the rubber is to be bonded. The treated surfaces are thereafter brought together in firm contact relationship and the rubber composition is vulcanized. Upon completion of the vulcanizing operation the rubber composition becomes firmly bonded to its associated article.

As a preferred example of an intermediate layer, reference may be had to the following composition:

| | Parts by weight |
|---|---|
| Rubber chloride | 100 |
| 1,3-dichlor 5,5-dimethyl hydantoin | 30 to 100 |
| Chlorinated diphenyl | 10 to 100 |
| Triphenyl stibine | 5 to 20 |
| Carbon black | 10 to 60 |

The rubber chloride and the 1,3-dichlor 5,5-dimethyl hydantoin form the principal and preferred combination from which good bonding properties result. The chlorinated diphenyl is added as a plasticizer and acts to further improve the adhesion to the rubber. Triphenyl stibine and carbon black are both believed to function as catalysts in promoting the adhesion reaction and afford improvement in strength of the adhesion bond. Other triaryl derivatives of an element of the nitrogen family having an atomic weight of at least 31, may be used, for example, in place of triphenyl stibine, triphenyl arsine may be substituted therefor. The composition as thus prepared may be used in the form of a cement in which case a suitable solvent is used such as benzene or xylene. The amount of solvent used may vary over a wide range depending on the consistency of the cement required. However, a good consistency of the cement for practical application can be prepared by the use of 600 parts of the solvent per 100 of rubber chloride. If a cement is employed, the cement may be applied to either or both the surface of the rubber composition or the surface of the material against which the rubber is to be united.

Instead of applying the material in the form of a cement, it may be masticated and milled to form a thin sheet which is interposed between the vulcanizable rubber composition and the material to which the rubber is intended to be attached. The milled sheet may be as thin as it is practical to form it. For example, the sheet may be in the order of .002 inch in thickness.

In order to obtain the proper bonding relationship, it is essential that heat be applied to the assembled layers and at least a sufficient pressure should be applied so that the materials are brought into a firm contact. Where the rubber composition is in the unvulcanized state, it is found that the heat normally required in vulcanizing the rubber composition is adequate to form the desired bond. A preferable heat range for producing the bonding relationship is in the order of 180° F. to 350° F.

The materials to which rubber may be bonded by the use of the intermediate layer includes the metals such as iron, zinc, tin, aluminum and the like. It is found, however, that the degree of adhesion varies among the different metals and that the highest degree of adhesion is obtained when the rubber is bonded to ferrous metals. In every case the strength of the rubber bond is high and is substantially equivalent to the tensile strength of the rubber itself. Besides the metals, the rubber composition, by the use of the intermediate layer described, may be readily bonded to other classes of materials such as glass, ceramics, plastics and the like. Also good bonds are obtained with materials such as wood, cellulose and the like. It is thus believed apparent that the base material to which the rubber composition may be bonded is not limited to any particular material but covers a relatively wide range of solids.

Likewise, the intermediate adhesion medium is applicable with various rubber compositions. It may be effectively employed with hard rubber compositions or with relatively soft rubber compositions. However, the best results appear to be obtained by an average rubber composition such as that disclosed as follows:

| | |
|---|---|
| Rubber | 100.0 |
| Carbon black | 50.0 |
| Zinc oxide | 2.0 |
| Softener | 2.5 |
| Stearic acid | 5.0 |
| Accelerator | 0.8 |
| Antioxidant | 1.0 |
| Sulfur | 2.5 |

In accordance with the practice of my invention, the high degree of adhesion obtained between a rubber composition and the base material permits a more extended use of the association of rubber and other materials particularly where the rubber is depended upon to react with forces tending to strain the bonded relationship. As thus shown and described, it is believed that this wide departure from conventional practices, which results in improved adhesion by a practical procedure, is novel and that the disclosure is to be interpreted broadly within the spirit of the invention and as defined in the appended claims.

Having thus described my invention, what I claim and desire to protect by Letters Patent is:

1. A composite product comprising a supporting base layer, a layer of rubber composition and a bonding composition layer interposed therebetween comprising rubber chloride and 1,3-dichlor 5,5-dimethyl hydantoin.

2. A composite product comprising a supporting base layer, a layer of rubber composition and a bonding composition layer interposed therebetween comprising rubber chloride, 1,3-dichlor 5,5-dimethyl hydantoin, and a plasticizer.

3. A composite product comprising a supporting base layer, a layer of rubber composition and a bonding composition layer interposed therebetween comprising rubber chloride, 1,3-dichlor 5,5-dimethyl hydantoin, and a chlorinated diphenyl plasticizer.

4. A composite product comprising a supporting base layer, a layer of rubber composition and a bonding composition layer interposed therebetween comprising rubber chloride, 1,3-dichlor 5,5-dimethyl hydantoin, and triphenyl stibine.

5. A composite product comprising a supporting base layer, a layer of rubber composition and a bonding composition layer interposed therebetween comprising rubber chloride, 1,3-dichlor 5,5-dimethyl hydantoin, and triphenyl arsine.

6. A composite product comprising a supporting base layer, a layer of rubber composition and a bonding composition layer interposed therebetween comprising rubber chloride, 1,3-dichlor 5,5-dimethyl hydantoin, and carbon black.

7. A composite product comprising a supporting base layer, a layer of rubber composition and a bonding composition layer interposed therebetween comprising rubber chloride, 1,3-dichlor 5,5-dimethyl hydantoin, triphenyl stibine, and carbon black.

8. A composite product comprising a supporting base layer, a layer of rubber composition and a bonding composition layer interposed therebetween comprising rubber chloride and at least 30 parts by weight of 1,3-dichlor 5,5-dimethyl hydantoin.

9. An adhesive composition comprising rubber chloride and 1,3-dichlor 5,5-dimethyl hydantoin.

10. A composite product comprising a supporting base layer, a layer of a vulcanizable rubber composition and a bonding composition layer interposed therebetween comprising rubber chloride and 1,3-dichlor 5,5-dimethyl hydantoin.

CORYDON M. GRAFTON.